United States Patent [19]

Nishimura

[11] 4,329,126
[45] May 11, 1982

[54] METHOD FOR PREVENTING A LEAKAGE LOSS OF GASES IN A SCREW COMPRESSOR

[75] Inventor: Yoshiyuki Nishimura, Kakogawa, Japan

[73] Assignee: Kobe Steel Limited, Kobe, Japan

[21] Appl. No.: 960,084

[22] Filed: Nov. 13, 1978

[30] Foreign Application Priority Data

Nov. 11, 1977 [JP] Japan ................. 52-136101

[51] Int. Cl.³ ............ F04C 18/16; F04C 27/00; F04C 29/00
[52] U.S. Cl. ............................ 418/1; 418/15; 418/83; 418/104; 418/201
[58] Field of Search ............. 418/1, 15, 83, 85, 102, 418/104, 201–203; 277/15, 29, 59

[56] References Cited

U.S. PATENT DOCUMENTS 3,989,413 11/1976 McGahan et al. ................. 417/310

Primary Examiner—John J. Vrablik
Attorney, Agent, or Firm—Oblon, Fisher, Spivak, McClelland & Maier

[57] ABSTRACT

A method for preventing a leakage loss of gases in an oil-free screw type rotary compressor including a housing, a rotor assembly comprising a pair of male and female rotor members rotatably mounted within said housing and a cooling jacket surrounding said housing, said housing and said pair of male and female rotor members defining therebetween an axially progressive series of sealed cavities for a gas, which method comprises the steps of returning as cooled a leakage gas from rotor shaft seals on the discharge side of said compressor to a first of said axially progressive series of sealed cavities, the leakage gas being returned to the compressor at a point where the suction cycle has been completed and the compression cycle has yet to begin.

3 Claims, 6 Drawing Figures

METHOD FOR PREVENTING A LEAKAGE LOSS OF GASES IN A SCREW COMPRESSOR

BACKGROUND OF THE ART

1. Field of the Invention

This invention relates to a method for preventing a leakage loss of gases in an oil-free screw type rotary compressor. More particularly, the invention relates to a method for preventing a leakage loss of gases from rotor shaft seals of an oil-free screw type compressor including a rotor assembly comprising a pair of male and female rotor members.

2. Description of the Prior Art

It is well known that a screw type rotary compressor is a machine which compresses a gas as its cooperating pair of male and female rotor members are revolved at high speeds in a compression chamber. The mechanism of compression which is involved in such a compressor is schematically illustrated in FIG. 1 which will be more particularly referred to hereinafter. Thus, a pair of male and female rotor members, generally indicated at 2, are rotatably mounted in a compression chamber 4 which, in turn, is disposed within a housing 3. The rotor members 2 have shafts 5, 5' which are rotatably supported in journal bearings 6, 6'. Said compression chamber 4 is surrounded by a water jacket 7 which controls a temperature increase within the chamber 4. The gas to be compressed is admitted to said compression chamber 4 under suction from a suction pipe 8 of the compressor, compressed to a predetermined pressure within said compression chamber 4 and discharged from a discharge pipe 9. Shaft seals 10, 10' are provided on the suction and discharge sides of said compression chamber 4 for the purpose of preventing leakage of the gas. Despite the provision of such seals, the pressure of the gas in the chamber 4 tends to overcome the seal pressure particularly at the shaft seals 10' on the discharge side, which is a high-pressure side, thus resulting in a loss of gas from the compression system. In those shaft-sealing areas, contact-free labyrinth seals, floating carbon rings or other seal members 11 suitable for high-speed rotating shafts are conventionally provided for the purpose of reducing the leakage loss to a minimum. However, on account of their inherent nature, these seals do not provide for complete sealing effects. Moreover, because a screw type rotary compressor has a couple of rotors as aforesaid, it is necessary that seals be provided in twice as many areas as it is the case with a compressor having only a single rotor, such as a turbo compressor, and this means that the leakage loss of gas is also twice as much as in the case of the latter type compressor. The leakage loss is still greater in the case of a multiple-stage screw compressor and, in fact, amounts to more than ten percent in a three- for four-stage compressor which is designed to provide a pressure gain from atmospheric pressure to 30 kg/cm² G, for instance. To prevent such leakage loss in this type of screw type rotary compressor, the leakage gas is usually returned to the suction pipe 8 of the compressor. Such a method for returning the leakage gas to the compressor is effective in the case of an open-type compressor but as far as a closed-type compressor is concerned, it does not provide for a true recovery of the leakage loss but merely egress of the gas into the atmosphere. Thus, as will be seen from FIG. 2, assuming that the suction capacity of the compressor is 100 percent and the amount of gas leakage is x percent, the above-described recycling system wherein the leakage gas is returned to the suction pipe provides only a suction of (100−x) percent from an external supply and, accordingly, a gas discharge of (100−x) percent. Thus, a loss of x percent is inevitable. This invention has been conceived and accomplished to prevent such a leakage loss of gas in a screw type rotary compressor.

Thus, the object of this invention is to provide a novel method for preventing a leakage of gases in an oil-free screw type rotary compressor, which is conducive to an increased volumetric efficiency of the compressor. Other objects and advantages of this invention will become apparent from the disclosure that follows.

SUMMARY OF THE INVENTION

This invention is, therefore, concerned with a method for preventing a leakage loss of gases in an oil-free screw-type compressor including a housing, a rotor assembly comprising a pair of male and female rotor members rotatably mounted within said housing and a cooling jacket surrounding said housing, said housing and said rotor assembly defining therebetween an axially progressive series of sealed cavities, which method comprises returning as cooled a leakage gas from rotor shaft seals on the discharge side of said compressor to a first of said axially progressive series of sealed cavities.

In another aspect, this invention relates to a method for preventing a leakage loss of gases as generally described above, wherein said leakage gas from rotor shaft seals is returned to said first of said axially progressive series of sealed cavities via a leakage gas compartment disposed downstreams of said rotor assembly and a leakage gas passageway connecting said leakage gas compartment with said first sealed cavity.

In a preferred embodiment of this invention, the aforesaid leakage gas passageway extends adjacently of said cooling jacket whereby said gas is cooled before it is returned to said sealed cavity.

In another embodiment, said leakage gas passageway is connected to a cooler located externally of the machine.

DETAILED DESCRIPTION OF THE PREFERRED EMBODIMENTS

Figure 4:
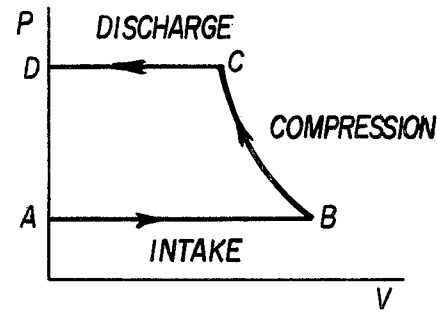
FIG. 4 is a diagrammatic representation of the compression cycle of the compressor embodying the principles of this invention.
Figure 5:
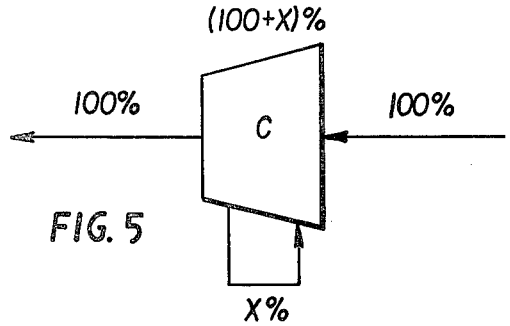
FIG. 5 is a diagrammatic representation of a gain in volumetric efficiency which is obtainable by the method of this invention.
Figure 3:
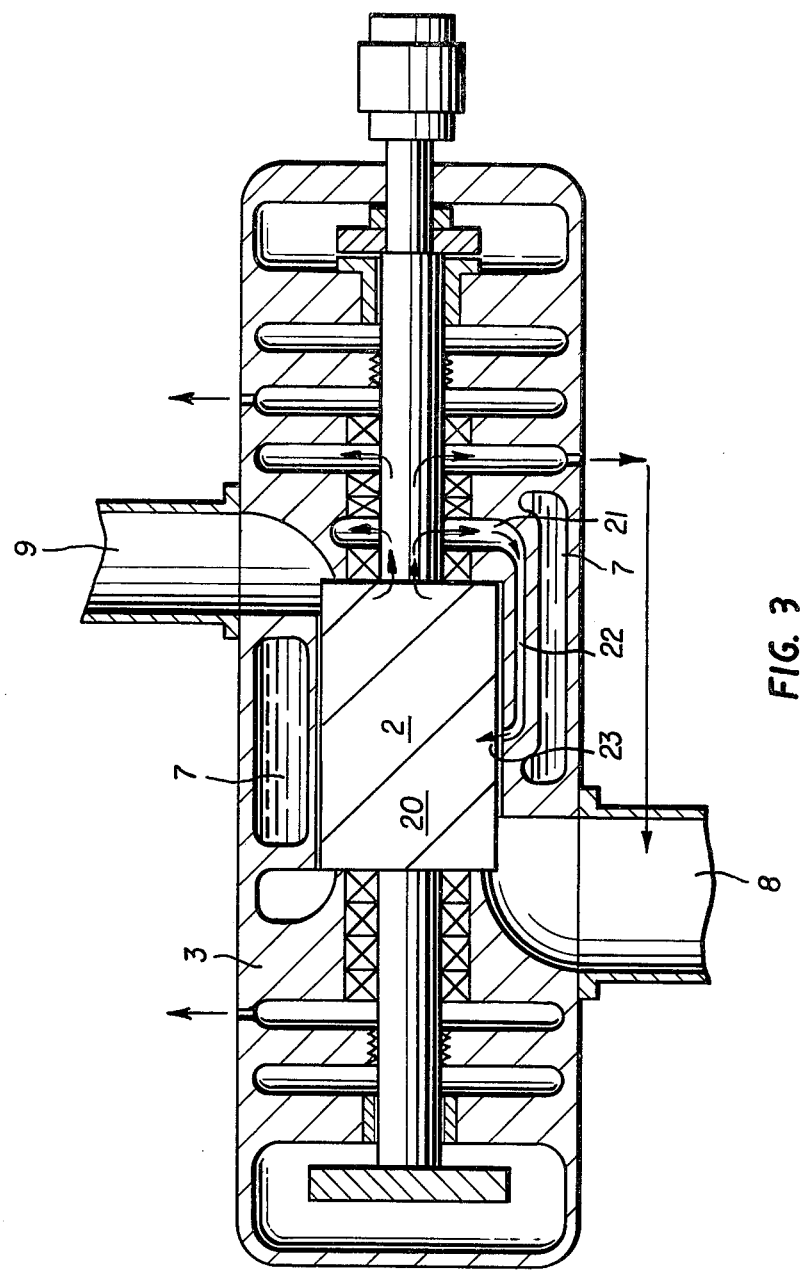
FIG. 3 is a schematic diagrammatic section view showing an oil-free screw type rotary compressor embodying the principles of this invention.

This invention will hereinafter be described in detail with reference to the preferred embodiments which are illustrated in the accompanying drawings. Referring to FIG. 3 which shows an oil-free screw type rotary compressor embodying the principles of this invention, the compressor comprises a rotor assembly 2 and a housing 3 which defines therebetween an axially progressive series of sealed cavities 20. The rotor assembly 2 actually comprises a pair of male and female rotor members and the suction gas is progressively compressed in said series of cavities 20. A leakage gas compartment 21 is provided adjacently of rotor shaft seals on the discharge side of the compressor, i.e. downstream of the rotor assembly 2. Adjacent a cooling jacket 7 which may be of the type commonly found in this general variety of compressor, there is provided a leakage gas passageway 22. Since the leakage gas from the rotor shaft seals is actually a portion of the compressed high-temperature gas, the direct return thereof to the compression system should cause an elevation of the suction temperature and, consequently, a corresponding increase in the temperature of the discharge gas. The positioning of said leakage gas passageway 22 near the cooling jacket 7 is intended to prevent such an elevation of discharge gas temperature by taking advantage of the cooling effect of the jacket. The portion 23 of said leakage gas passageway 22 which opens into said axially progressive series of sealed cavities 20 is located in a predetermined position which corresponds to Point B on the pressure-volume diagram of FIG. 4. It is the position where the suction cycle has just been completed and the compression cycle is about to start. In this position, the leakage gas is secluded from the gas on the suction side. Since the leakage gas from shaft seals 10' on the discharge side is directly returned to the first cavity in said axially progressive series of sealed cavities, which corresponds to Position B mentioned above, the volumetric efficiency of the compressor is increased by a percentage equal to the percent amount of leakage. Thus, referring to FIG. 5, let it be assumed, again, that the suction volume of the compressor is 100 percent and the amount of leakage is x percent. Since the entire amount of leakage gas, which is x percent, is directly returned to said first sealed gas cavity, the volume of gas which is compressed is equal to 100 $+x$ percent, that is to say 100 percent of the capacity is discharged. This means that the volumetric efficiency of the compressor is improved by a percentage point equal to the percent volume of leakage gas and, therefore, a complete recovery of the leakage gas is accomplished.

Figure 1:
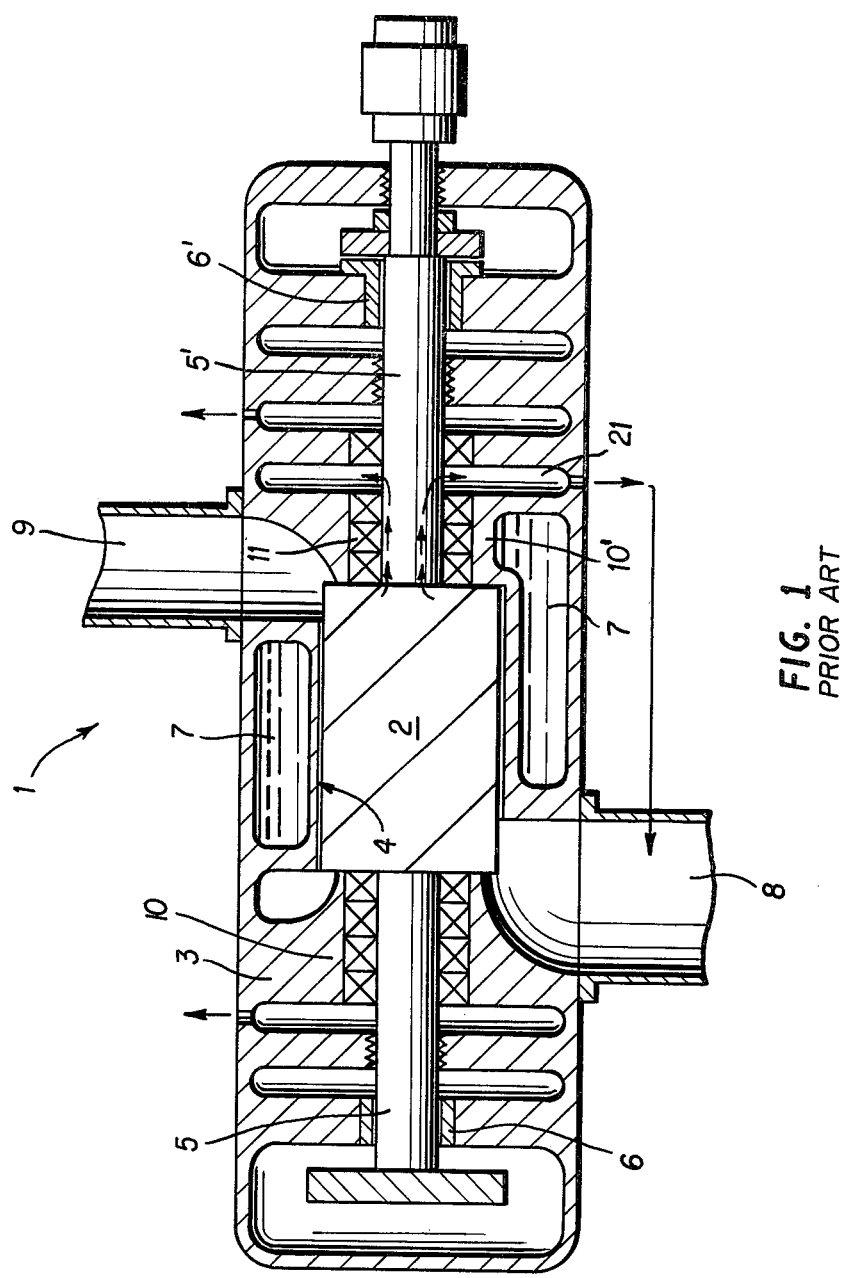
FIG. 1 is a schematic diagrammatic section view showing a conventional oil-free screw type rotary compressor.
Figure 6:
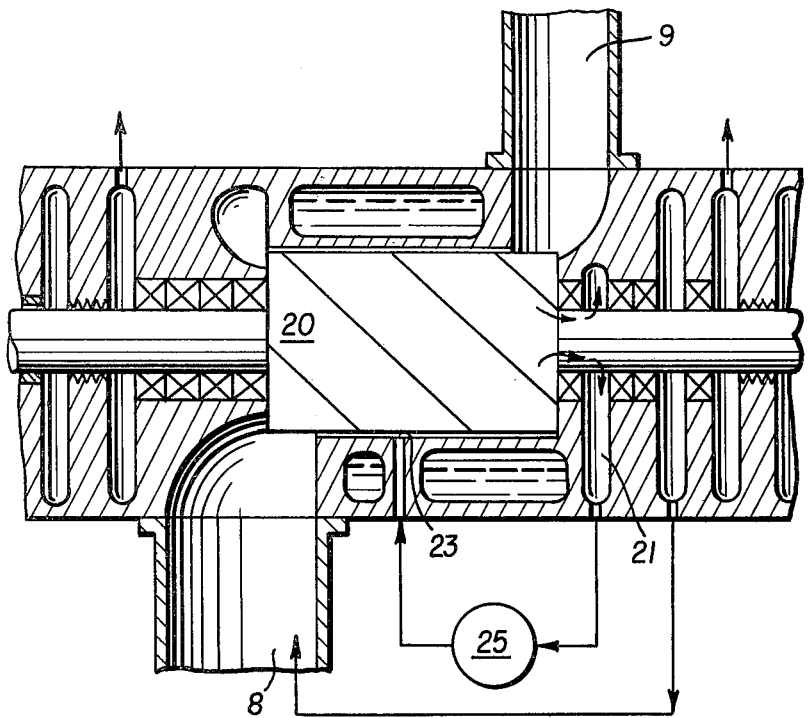
FIG. 6 is a schematic diagrammatic section view showing another oil-free screw type rotary compressor embodying the principles of this invention.
Figure 2:
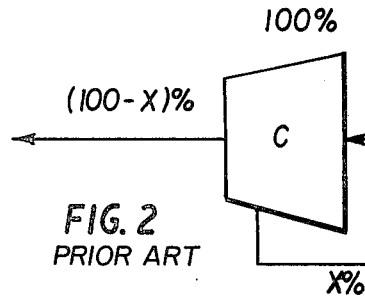
FIG. 2 is a diagrammatic representation of the leakage loss of gas in such a screw-type rotary compressor.

While, in the above embodiment, means for returning the leakage gas, i.e. leakage gas passageway 21, is provided within the machine, the leakage gas may be returned to said first sealed gas cavity through a cooler 25 located externally of the machine as illustrated in FIG. 6.

Having been described hereinbefore by way of preferred embodiments, this invention provides an improved recovery of leakage gas through very simple means. Thus, the invention increases the volumetric efficiency of the compressor by the amount equal to the amount of leakage, thus accomplishing commercially very advantageous results.

The principles of this invention have been described herein in sufficient detail to enable others to understand the invention. As many possible embodiments of this invention may be made and as many possible changes may be made in the embodiments herein described, it is to be distinctly understood that the foregoing description is to be interpreted as merely as illustrative of this invention and not as a limitation.

What is claimed is:

1. A method for preventing a leakage loss of gases in an oil-free screw type rotary compressor including a housing, a rotory assembly comprising a pair of male and female rotor members rotatably mounted within said housing and a cooling jacket surrounding, said housing and said pair of male and female rotor members defining therebetween an axially progressive series of sealed cavities for a gas, which method comprises the steps of:

collecting gaseous working fluid leaking from rotor shaft seals on the discharge side of the compressor;

cooling the leakage gas from the rotor shaft seals on the discharge side of the compressor;

returning, as cooled, the leakage gas to a first of said axially progressive series of sealed cavities, said gas being returned to the compressor at a point where suction has been completed and compression is yet to begin, thereby obtaining an increase in volumetric efficiency directly proportional to the leakage of the gaseous working fluid;

wherein said leakage gas being returned to the compressor has been cooled to a temperature no higher than that of the gas already in said first sealed cavity at said point where suction has been completed and compression is yet to begin.

2. A method for preventing a leakage loss of gases as claimed in claim 1 wherein a leakage gas compartment is provided downstream of said rotor assembly and adjacent to said shaft seals and said leakage gas is returned to said first of said axially progressive series of sealed cavities through a leakage gas passageway connecting said leakage gas compartment with said first sealed cavity and extending adjacently of said cooling jacket whereby said gas is cooled before it is returned to said first sealed cavity.

3. A method for preventing a leakage loss of gases as claimed in claim 1 wherein a leakage gas compartment is provided downstream of said rotor assembly and adjacent to said shaft seals and said gas is returned to said first of said axially progressive series of sealed cavities through a leakage gas passageway connecting said leakage gas compartment with said first sealed cavity via a cooling means disposed externally of said compressor.

* * * * *